May 5, 1970  W. E. McCAFFERTY  3,510,710

CONNECTION FOR CARBON BRUSHES

Original Filed Dec. 22, 1965

INVENTOR
WILLIAM E. McCAFFERTY

BY Robert J. Crawford
ATTORNEY

United States Patent Office 3,510,710
Patented May 5, 1970

3,510,710
CONNECTION FOR CARBON BRUSHES
William E. McCafferty, St. Marys, Pa., assignor to Air Reduction Company, Incorporated, New York, N.Y., a corporation of New York
Continuation of application Ser. No. 515,690, Dec. 22, 1965. This application Nov. 27, 1968, Ser. No. 779,659
Int. Cl. H01r 39/26; C04b 35/66
U.S. Cl. 310—249                                    4 Claims

ABSTRACT OF THE DISCLOSURE

A carbon brush comprising in combination a carbon block having a cavity formed therein, an electrical conductor having an end portion disposed in said body cavity, and a body of conductive silver coated graphite-based granules compacted between said portion of the cable and the cavity wall to provide a mechanical and electrical connection therebetween.

This application is a continuation of Ser. No. 515,690 filed Dec. 22, 1965, now abandoned.

This invention relates to connections for carbon brushes and the like, and more particularly relates to the combination, with an electrically conductive block of carbonaceous material, of a flexible conductor terminally anchored thereto by a tamped connection of the type hereinafter defined.

The invention finds its greatest present practical utility in the field of electrical brushes adapted for use in electric motors or generators, composed of carbon, graphite, metal graphite, or the like (herein generically termed "carbon") and provided with flexible copper conductors or leads, such as those of the stranded copper wire cable or pigtail type, terminally secured thereto by embedment in the brush body, whereby such a brush may be connected in an electrical circuit. In hereinafter explaining the nature of the present invention, therefore, reference will be made more particularly to an electrical brush as a typical illustrative embodiment thereof, but it will be understood that the invention has practical application in other fields also as, for example, in manufacturing electrical discharge machine electrodes.

The use in such tamped connections of powdered metals, in particular powdered spongy copper produced by the reduction of copper oxide, was first proposed more than fifty years ago (McCourt Pat. No. 904,077). In an effort to improve this general type of connection in one respect or another, various modifications of it have appeared from time to time in later patents. One is the use of a powdered copper amalgam (Eynon Pat. No. 1,188,635) as the tamping material. Another proposal involves tamping a mixture of powdered copper and some lower melting metal in powder form, such as tin or lead, into the hole in the brush body around the inserted end portion of the flexible conductor, and then heating the assmeblage to a temperature sufficiently high to fuse the lower melting metal and unite the particles of powdered copper into an integral mass which, in turn, is also in fused metal union with the conductor, thus providing a kind of soldered junction of the conductor to the body of the brush (Adams et al., 1,770,825, Eynon 1,885,903). An additional proposal was the use of silver coated copper powder (Falcettoni Pat. No. 2,631,252) as the tamping material. Although these and other prior proposals for improving upon the original simple tamped copper powdered connection have aimed at increasing its electrical conductivity and rendering it mechanically stronger and more resistant to pulling out, it is well known that there has thus far been only partial success, at the most, in attaining these objectives.

Thus, in the case of the mercury-copper amalgam tamped connection, which has been employed extensively in commercial practice heretofore because of relative ease of manufacture and reasonably satisfactory performance under moderate current loads, present day current requirements often cause excessive heating of the connection to occur, resulting in shrinkage of the pigtail-anchoring slug of amalgam, with consequent increase in resistance. This causes more heating, with further shrinkage and rise in resistance, and so on in cycle, until the connection fails from burning of the wire pigtail. The slug of amalgam may even shrink so much as to be free to fall out of the brush body.

As regards the soldered type of connection referred to hereinabove, not only is this type more expensive to produce because of the additional step of heating required after the tamping operation, but its electrical resistance is higher than is desirable and hence, also, its tendency to overheat excessively.

To date, one of the most successful tamping powders has been the silver coated copper powder disclosed in the aforementioned Falcettoni Pat. No. 2,631,252 which is assigned to the assignee of the present invention. However, recent increases in horsepower ratings of various motors, such as railroad traction motors, has resulted in an alarming increase in failures of shunt connections. It has therefore become necessary to develop tamping compositions which will form shunt connections which can carry increased current loads and at the same time retain their electrical and physical properties.

It is an object of the present invention to provide a novel tamped connection for carbon brushes and the like possessing improved characteristics that render it superior both electrically and mechanically to any tamped connection heretofore available so far as this applicant is aware. This object is achieved in accordance with the principles of the invention by employing as tamping material finely divided graphite granules in mixture with a relatively small percentage of binder such as phenolic resin or in the alternative by employing as the tamping material finely divided graphite particles which have been previously provided with a coating of silver. In some instances, it is also possible to prepare and utilize the graphite and silver coated graphite particles without the use of a binder. The tamping material in either alternative is in fluent pulverulent or granular condition and capable, under pressure, of concentrating or compacting into a coherent mass. This granular mass, when firmly compacted by the customary tamping operation, provides a continuous medium wherein the granules are no longer in discrete form and provides a metal conductor connection or anchored in a carbon brush that has noteworthy points of superiority.

Generally, shunt connections for carbon brushes are formed by fitting the shunt at the bottom of a hole drilled into the top part of the brush. Usually this hole is about 0.050 in. larger in diameter than the shunt. The sides of the hole are generally scored or rifled. The shunt itself normally consists of a grouping of fine wires twisted or woven into a cable that carries electrical current to or from the brush. Shunts are generally made from copper and come in a number of wire sizes and groupings to satisfy the application for which a particular brush may be designed. Tamping powder, which must be a free-flowing conductive powder, is fed into the brush around the shunt connection and tamped between the shunt and the sides of the hole to anchor the shunt to the brush. A binder or sealant such as a phenolic resin is then dissolved in a suitable agent such as methanol, and several drops are applied with an eye dropper at the top of the shunt connection to glue the tamping powder together and to help seal out moisture. The sealant is cured by placing a metal tray of treated brushes over a series of infrared lamps. The sealant does not penetrate to the bottom of the tamped connection, but instead leaves a substantial portion of the shunt connection without sealant or binder.

A study of the prior art shunt connections which failed showed that the shunt became loose and discolored, or there was a complete absence of tamping powder in the bottom portion of the connection, or there was fraying of the shunt just above the connection. It was therefore necessary to develop a tamping medium which would form shunt connections that did not have the failure characteristics of the prior art shunt connections. From the outset, two materials, silver and graphite, appeared to be the most promising for use as the tamping material. However, silver is far too expensive for extensive use in shunt connections. On the other hand, graphite is fairly inexpensive but it was generally believed that its electrical resistance was too high. In addition, the standard automatic tamping machine design demands that the tamping powder must me free-flowing into the shunt connection during the tamping operation. Conventional graphite flours and silver powders do not flow freely and were also believed unsuitable for this reason unless each could be converted into a free-flowing powder. Further, it was found that conventionally manufactured silver coated graphite powder did not flow as freely as desired.

It is therefore another object of the invention to define a method of converting graphite flours and silver coated graphite powders into free-flowing finely divided granules which are suitable for use in shunt connections. This method will be described in detail hereinafter.

In addition to the foregoing objectives, many other objects, features, and advantages of this invention will be readily apparent from consideration of the following specification relating to the annexed drawings in which.

Figure 2:
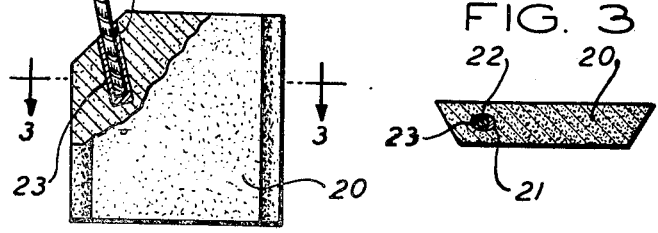
FIG. 2 is a side elevation, partially broken away and in vertical section, of a carbon block provided with the novel connection.
Figure 3:
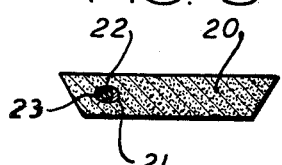
FIG. 3 is a transverse section on the line 3—3 of FIG. 2.

Referring to FIGS. 2 and 3 of the drawings, a carbon block 20 is provided with a hole 21 formed therein, of a diameter somewhat larger than that of the end portion of stranded wire cable or flexible pigtail lead 22, centrally positioned within said hole. Surrounding the inserted end portion of the cable and tightly filling the space between it and the wall of the hole is the hereindescribed tamping material which is consolidated under pressure by tamping in the conventional manner to form a compacted sleeve-like body 23.

Figure 1:
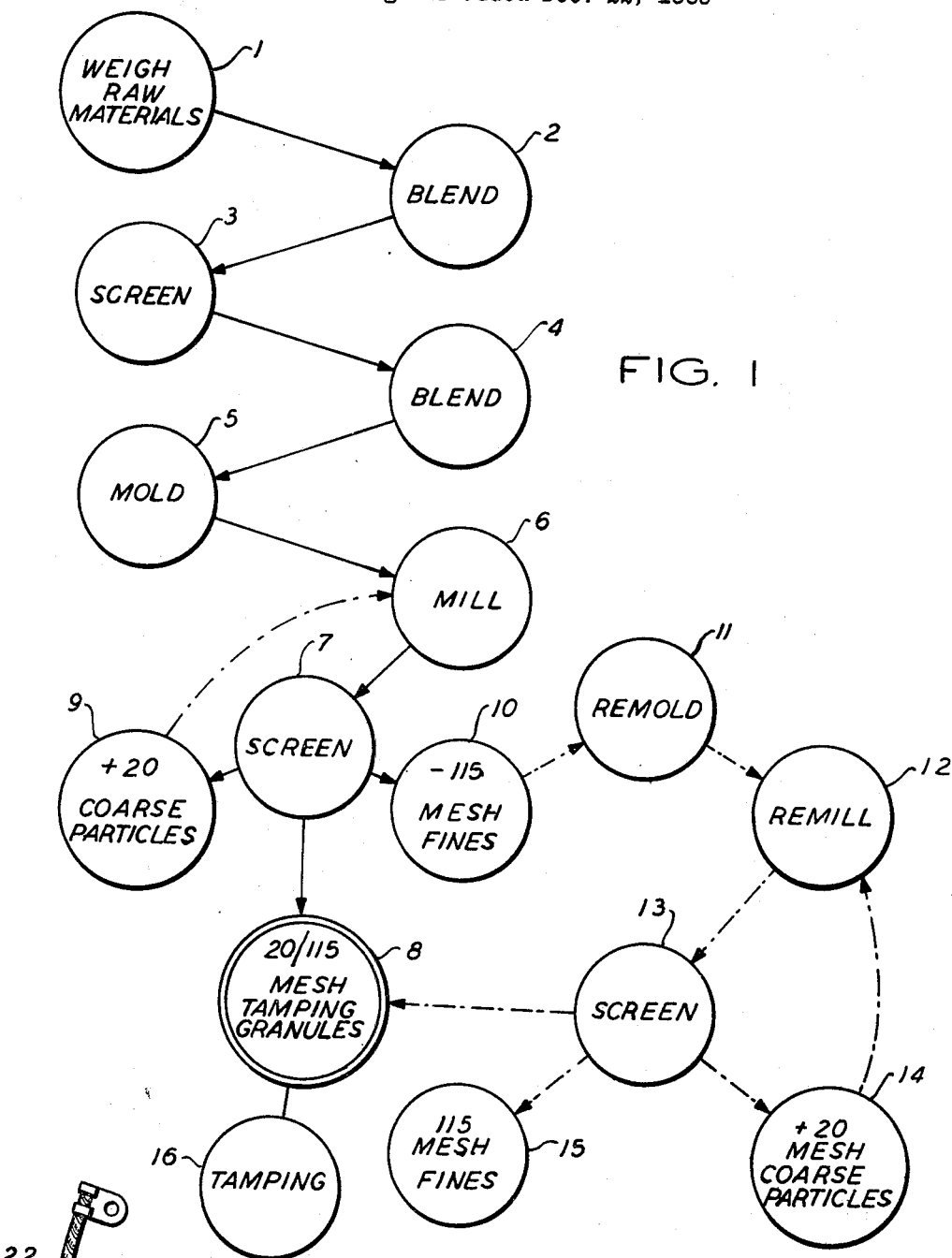
FIG. 1 is a flow diagram illustrating the procedure for converting graphite flour and silver coated graphite into free-flowing finely divided granules.

In producing free-flowing graphitic powder suitable for use in shunt connections, the process outlined in FIG. 1 is utilized. Raw materials are weighed at 1. The raw materials consist of a conventional graphite flour and normally a binder such as phenolic resin, although such binder is not essential. The main function of the binder is to aid in subsequent molding operations. The particular binder used forms no part of this invention but it must be selected to have excellent strength and stability at high temperatures. Experience has indicated that phenolic resin identified as Varcum 3015 and which may be purchased from Varcum Chemical Company, is preferred as the binding material. Other resins, such as BPR–5095 phenolic resin which may be purchased from Union Carbide Corp., are also suitable. The amount of binder in the mix may vary from 0%–20% of the total weight of graphite and binder mix. The preferred amount of binder is 3%–15% of the total weight of the mix to obtain the best molding characteristics.

The raw materials are then blended at 2 for a sufficient length of time to obtain a complete mixture which may take, for example, 20 min. to 1 hr. The blended mixture is then screened through a 20–60 mesh screen at 3 for removal of agglomerates. The screened material is again blended for 20 min, to 1 hr. at 4, and then molded at approx. 10–20 tons/sq. in. into relatively small blocks at 5. The molded material is then milled at 6 into small granules and screened through a 20 mesh screen onto a 115 mesh screen at 7, although the screen sizes may vary within this approximate range to accommodate the particular shunt connection characteristic, the smaller shunts requiring finer and more uniform particles. The material which passes the 20 mesh screen and is caught by the 115 mesh screen is then suitable for use as tamping granules and is collected at 8. The free-flowing granules are then utilized to form shunt connections at 16 by conventional tamping means. Coarse material which does not pass the 20 mesh screen is collected at 9 and returned to the mill for remilling at 6. Extremely fine material which passes the 115 mesh screen is collected at 10, remolded at 11, remilled at 12, and again screened through a 20 mesh screen onto a 115 mesh screen at 13. As before, +20 mesh granules are collected at 14 and remilled at 12, while the 20 to 115 mesh material is collected at 8 for tamping granules. The −115 mesh fines are collected at 15 and as before may be remolded and again run through the milling and collecting process.

The above specific process produces tamping granules which flow freely and form shunt connections of excellent quality as more specifically defined hereinafter. It is to be understood that although the process has been described specifically, minor variations may be made to the process and still be within the scope of this invention. The essential steps of the process are to mix the graphite flour and binder in suitable quantities, cold mold the mixture at approximately 10 to 20 tons/sq. in., mill the molded pieces, and screen the coarse milled mix to select granules within a definite size range, and tamp shunt connections with the selected granules. The rescreening, remolding, and remilling steps are advantageous in that they allow for more complete use of the original mix.

The selection of granules in the range −20 mesh to +115 mesh is important.

In a specific example, a mixture of 95% graphite and 5% Varcum 3015 phenolic resin was formed into a shunt connection by the process outlined above. The Varcum 3015 phenolic resin is, as previously pointed out, commercially available and is a typical two-step powdered phenolic resin containing hexamethylenetetramine curing agent and has an average molecular weight of approximately 740. It is comprised of a Novolak resin to which the hexamethylenetetramine curing agent has been added during the grinding step. The Novolak resin is an acid catalyzed condensation product of formaldehyde and straight phenol.

Generally speaking, brushes installed on a particular dynamo-electric machine are required to have a certain specified voltage drop. This voltage drop should remain constant, if possible, throughout the life of the brush. To illustrate the improvement of the graphite tamping compound of this invention a group of brushes containing the graphite tamping granules of the specific example set forth above were compared with a group of brushes containing the prior art silver coated copper tamping compound in a conventional shock test. A 10 min. shock test wherein the shunt connections on the brushes of each group were subjected to 40 ampere current for 9 min. and 60 ampere current for 1 min., the cycle being repeated for 480 hr., was carried out. The following average voltage drop was observed in the two groups.

| Tamping compound | Average 1/8 x 3/4 MV drop | |
|---|---|---|
| | Initial | After 480 hr. shock testing |
| Graphite, Phenolic resin | 31.0 | 25.1 |
| Silver coated copper | 14.9 | 49.7 |

In another series of tests similar to that described above, several groups of brushes having a tamping compound comprised of graphite granules and epoxy resin were compared with brushes having the silver coated copper compound. The results of the tests are shown in the table below, the ratio of graphite to epoxy resin being supplied for each group of brushes. The epoxy resin used in each case may be purchased commercially from Furane Plastics, Incorporated, under the tradename "Epibond 100A" and is a 100% reaction epoxy resin having a molecular weight in excess of 1000.

| Tamping compound | Average 1/8 x 3/4 MV drop | |
|---|---|---|
| | Initial | After 480 hr. shock testing |
| 95% graphite, 5% epoxy | 24.8 | 24.0 |
| 90% graphite, 10% epoxy | 24.8 | 27.9 |
| 85% graphite, 15% epoxy | 35.8 | 34.3 |
| Silver coated copper | 13.2 | 35.0 |

The above data clearly illustrates that the voltage characteristics of the brushes utilizing the graphite tamping granules of this invention remain relatively constant during rugged use as compared to the voltage characteristics of the prior art brush utilizing silver coated copper compounds.

As an alternative to the graphite tamping granules, I have discovered that silver coated graphite granules are at least equal, if not superior, to the performance of the graphite granules when used in tamped shunt connections. By using silver coated graphite as the tamping material, it is possible to utilize inexpensive graphite to form the bulk of the tamping powder and at the same time obtain the benefit of the highly conductive and more expensive silver which can be utilized in small amounts. The base graphite powder can be coated by any conventional means such as the formaldehyde reduction onto the powder of a silvering solution consisting of silver nitrate and ammonium hydroxide or the particles may be purchased commercially. In either event, the ratio by weight of silver to graphite in the particles is preferably in the range of 75%–95% graphite and 5%–25% silver.

The silver coated graphite particles are processed for use as tamping powder in a similar manner as defined for the processing of the graphite flour. Referring again to FIG. 1, 80% to 100% silver coated graphite particles are combined with 0% to 20% resin binder as at 1. The binder is preferably Varcum 3015 phenolic resin as mentioned above. As in the case of forming graphite granules, the preferred amount of binder is 3% to 15% of the total weight of the mix. The silver coated graphite powder after mixing is processed by the same steps outlined for the formation of the graphite granules.

As a specific example, a silver coated graphite powder containing 8% silver by weight was processed by mixing 95% powder and 5% Varcum 3015 phenolic resin binder and following the steps as outlined in FIG. 1. Brushes formed from this formulation were subjected to a 30 min. cycle shock test and the results were compared with the results obtained by subjecting brushes which utilize copper coated tamping powder to the same test. The 30 min. shock test is the same as the 10 min. shock test described above, except that the brushes were subjected to 40 ampere current for 29 min., and 60 amperes current for 1 min., the cycle being repeated for 360 hr. The results of the test are as follows:

| Tamping compound | Average 1/8 x 3/4 MV drop | |
|---|---|---|
| | Before shock test | After shock test for 360 hr. |
| Silver coated graphite | 36.4 | 21.7 |
| Silver coated copper powder | 13.9 | 49.2 |

The voltage stability of the brushes which utilized silver coated graphite granules as tamping compound is clearly superior to the stability of the brushes which used silver coated copper as the tamping compound.

I claim:

1. In combination, a carbon block having a cavity formed therein, an electrical conductor having an end portion disposed in said cavity, and a body of conductive granules tamped between said portion of the conductor and the cavity wall, said conductive granules consisting essentially of 85% to 97% by weight silver-coated graphite particles and 15% to 3% by weight of a resin binder.

2. In combination, a carbon block having a cavity formed therein, an electrical conductor having an end portion disposed in said cavity, and a body of conductive granules tamped between said portion of the conductor and the cavity wall, said conductive granules consisting essentially of silver-coated graphite.

3. The combination of claim 2 wherein said silver-coated graphite consists of 75% to 95% by weight graphite and 25% to 5% by weight silver.

4. The combination of claim 3 wherein the size of said granules is in the range −20 mesh to +115 mesh.

References Cited

UNITED STATES PATENTS

| 2,518,919 | 8/1950 | McKinstry et al. | 310—249 |
| 2,849,631 | 8/1958 | Matz | 310—249 |

ROBERT F. WHITE, Primary Examiner

K. J. HOVET, Assistant Examiner

U.S. Cl. X.R.

29—630; 264—105; 310—253